United States Patent
Seok

(10) Patent No.: US 9,668,125 B2
(45) Date of Patent: May 30, 2017

(54) METHOD AND APPARATUS FOR COMPRESSING MAC HEADER IN WIRELESS LAN SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 14/384,635

(22) PCT Filed: Mar. 11, 2013

(86) PCT No.: PCT/KR2013/001925
§ 371 (c)(1),
(2) Date: Sep. 11, 2014

(87) PCT Pub. No.: WO2013/137603
PCT Pub. Date: Sep. 19, 2013

(65) Prior Publication Data
US 2015/0029977 A1     Jan. 29, 2015

Related U.S. Application Data

(60) Provisional application No. 61/609,326, filed on Mar. 11, 2012.

(51) Int. Cl.
*H04W 8/26* (2009.01)
*H04W 72/04* (2009.01)
(Continued)

(52) U.S. Cl.
CPC ......... *H04W 8/26* (2013.01); *H04W 72/0406* (2013.01); *H04W 76/023* (2013.01); *H04W 84/12* (2013.01)

(58) Field of Classification Search
None
See application file for complete search history.

(56) References Cited

U.S. PATENT DOCUMENTS

2008/0219196 A1*  9/2008  Ptasinski ............... H04W 52/02
                                                           370/311
2009/0022132 A1   1/2009  Adachi et al.
(Continued)

FOREIGN PATENT DOCUMENTS

KR   10-2010-0028635    3/2010
KR   10-2011-0114518    10/2011
(Continued)

OTHER PUBLICATIONS

PCT International Application No. PCT/KR2013/001925, Written Opinion of the International Searching Authority dated Jun. 25, 2013, 1 page.

*Primary Examiner* — Hassan Kizou
*Assistant Examiner* — Roberta A Shand
(74) *Attorney, Agent, or Firm* — Lee, Hong, Degerman, Kang & Waimey

(57) ABSTRACT

The present invention relates to a wireless communication system, and more particularly, to a method and apparatus for performing MAC header compression in a wireless communication system. In a wireless communication system according to an embodiment of the present invention, a station STA may: receive information on assigning a plurality of association identifiers (AIDs) to the station STA from an access point (AP); receive, from the AP, a first frame including a medium access control (MAC) header that includes an address field set to one of the plurality of AIDs; and assign each of the plurality of AIDs by flow for the station STA.

18 Claims, 17 Drawing Sheets

(51) Int. Cl.
*H04W 76/02* (2009.01)
*H04W 84/12* (2009.01)

(56) References Cited

U.S. PATENT DOCUMENTS

| | | | |
|---|---|---|---|
| 2011/0317630 A1* | 12/2011 | Zhu | H04W 74/0816 370/329 |
| 2012/0063335 A1* | 3/2012 | Cho | H04W 8/186 370/252 |
| 2013/0155952 A1* | 6/2013 | Chu | H04L 45/74 370/328 |
| 2014/0036775 A1* | 2/2014 | Asterjadhi | H04W 28/065 370/328 |
| 2014/0064231 A1* | 3/2014 | Park | H04W 12/06 370/329 |
| 2014/0064261 A1* | 3/2014 | Wang | H04W 40/02 370/338 |

FOREIGN PATENT DOCUMENTS

| | | |
|---|---|---|
| WO | 2011/068387 | 6/2011 |
| WO | 2011/068985 | 6/2011 |

\* cited by examiner

FIG. 15

| Category | Action | Dialog Token | AID | Flow Information Element |
|---|---|---|---|---|
| 1 | 1 | 1 | 2 | variable |

METHOD AND APPARATUS FOR COMPRESSING MAC HEADER IN WIRELESS LAN SYSTEM

CROSS-REFERENCE TO RELATED APPLICATIONS

This application is the National Stage filing under 35 U.S.C. 371 of International Application No. PCT/KR2013/001925, filed on Mar. 11, 2013, which claims the benefit of U.S. Provisional Application Ser. No. 61/609,326, filed on Mar. 11, 2012, the contents of which are hereby incorporated by reference herein in their entirety.

TECHNICAL FIELD

The present invention relates to a wireless communication system and, more particularly, to a method and apparatus for performing medium access control (MAC) header compression in a wireless local area network (LAN) system.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

DISCLOSURE

Technical Problem

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. In M2M communication in which the number of apparatuses is increased, when it takes considerable time for one apparatus to access a channel, system performance may deteriorate and power consumption of the apparatus may be increased.

An object of the present invention devised to solve the problem lies in a method for reducing overhead and power consumption by compressing or omitting information included in a MAC header. Another object of the present invention devised to solve the problem lies in a method for further reducing overhead of a MAC header by using an association ID (AID) assigned to each flow with respect to address information included in a MAC header.

The technical problems solved by the present invention are not limited to the above technical problems and other technical problems which are not described herein will become apparent to those skilled in the art from the following description.

Technical Solution

The object of the present invention can be achieved by providing a method for transmitting a frame at a first station (STA) in a wireless communication system including receiving, from a second STA, information about assignment of a plurality of association identifiers (AIDs) to the first STA and transmitting, to the second STA, a first frame including a medium access control (MAC) header including an address field set to one of the plurality of AIDs, wherein each of the plurality of AIDs is assigned to each flow of the first STA.

In another aspect of the present invention, provided herein is an apparatus of a first station (STA) for transmitting a frame in a wireless communication system including a transceiver and a processor, wherein the processor is configured to receive, from a second STA, information about assignment of a plurality of association identifiers (AIDs) to the first STA using the transceiver and transmit, to the second STA, a first frame including a medium access control (MAC) header including an address field set to one of the plurality of AIDs using the transceiver, and wherein each of the plurality of AIDs is assigned to each flow of the first STA.

The embodiments of the present invention may have the following features.

Each of the plurality of AIDs may be mapped to information for specifying a flow of the first STA.

The information for specifying the flow may include at least one of traffic classification, duty cycle, wakeup interval, group identification information, transmitter MAC address, receiver MAC address, source Internet protocol (IP) address, destination IP address, subnetwork access protocol (SNAP)/logical link control (LLC) header, IP header, transmission control protocol (TCP)/user data gram protocol (UDP) header information.

The second STA may be an access point (AP) and the MAC header of the first frame may include a basic service set identifier (BSSID) of the AP as a receiver address (RA) and includes one of the plurality of AIDs assigned to the first STA as a transmitter address (TA).

The second STA may be an access point (AP), the method may further include receiving, from the AP, a second frame including a MAC header including an address field set to one of the plurality of AIDs, and the MAC header of the second frame may include one of the plurality of AIDs assigned to the first STA as a receiver address (RA) and include a basic service set identifier (BSSID) of the AP as a transmitter address (TA).

The MAC header of the first frame may include a MAC address of the second STA as a receiver address (RA) and includes one of the plurality of AIDs assigned to the first STA as a transmitter address (TA).

The method may further include transmitting, to the second STA, a flow AID assignment frame for requesting assignment of the plurality of AIDs, and the flow AID assignment frame may include an AID field and a flow information element field.

A value of the AID field may be set to 0.

The information about assignment of the plurality of AIDs to the first STA may be received via a flow AID assignment frame from the second STA, and the flow AID assignment frame may include an AID field and a flow information element field.

The flow information element field may include information for specifying a flow of the first STA.

The information for specifying the flow may include at least one of traffic classification, duty cycle, wakeup interval, group identification information, transmitter MAC address, receiver MAC address, source Internet protocol (IP) address, destination IP address, subnetwork access protocol (SNAP)/logical link control (LLC) header, IP header, transmission control protocol (TCP)/user data gram protocol (UDP) header information.

Release of assignment of one of the plurality of AIDs may be indicated by a flow AID assignment frame including the AID field but not including the flow information element field.

It is to be understood that both the foregoing general description and the following detailed description of the present invention are exemplary and explanatory and are intended to provide further explanation of the invention as claimed.

Advantageous Effects

In the present invention, it is possible to provide a method and apparatus for reducing overhead and power consumption by compressing or omitting information included in a MAC header. In addition, in the present invention, it is possible to provide a method and apparatus for further reducing overhead of a MAC header by using an association ID (AID) assigned to each flow with respect to address information included in a MAC header.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 15 is a diagram showing an exemplary format of an AID assignment frame proposed by the present invention;

BEST MODE

Figure 1:
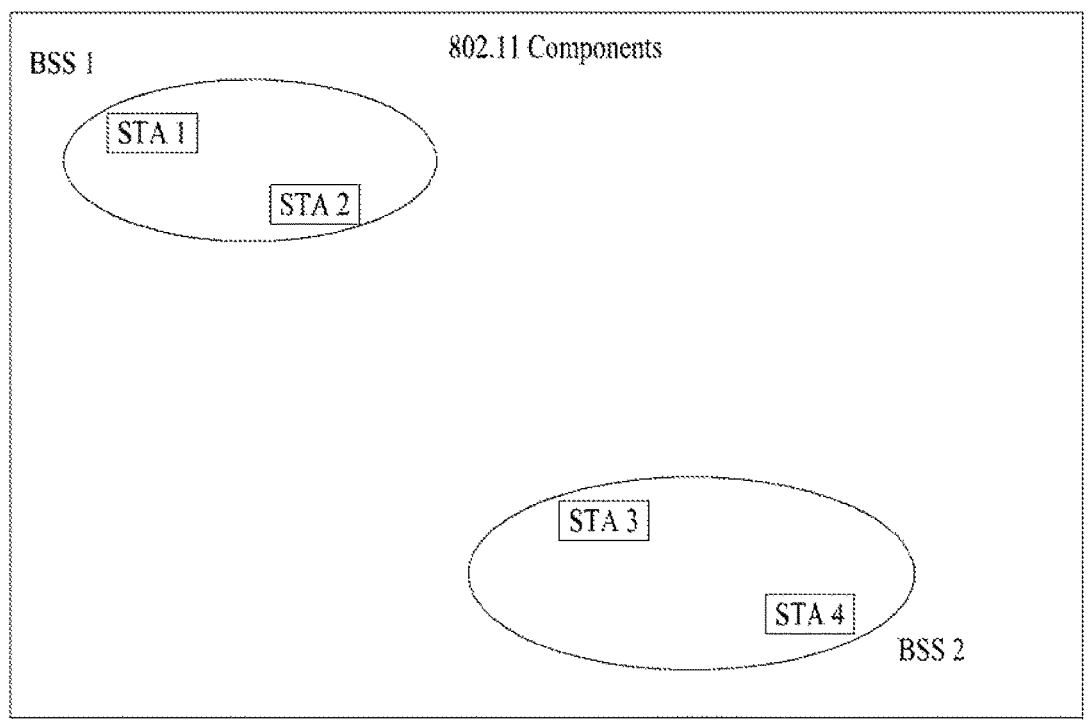
FIG. 1 is a diagram showing an exemplary structure of an IEEE 802.11 system to which the present invention is applicable.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments by which the concepts explained herein can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with radio technology such as UTRA (Universal Terrestrial Radio Access) or CDMA2000. TDMA may be embodied with radio technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on an IEEE 802.11 system. However, technical features of the present invention are not limited thereto.

Structure of WLAN system

FIG. 1 is a diagram showing an exemplary structure of an IEEE 802.11 system to which the present invention is applicable.

An IEEE 802.11 structure may be composed of a plurality of components and a wireless local area network (WLAN) supporting station (STA) mobility transparent to a higher layer may be provided by interaction among the components. A basic service set (BSS) may correspond to a basic component block in an IEEE 802.11 LAN. In FIG. 1, two BSSs (BSS1 and BSS2) are present and each BSS includes two STAs (STA1 and STA2 are included in BSS1 and STA3 and STA4 are included in BSS2) as members. In FIG. 1, an ellipse indicating the BSS indicates a coverage area in which STAs included in the BSS maintains communication. This area may be referred to as a basic service area (BSA). If an STA moves out of a BSA, the STA cannot directly communicate with other STAs in the BSA.

In an IEEE 802.11 LAN, a BSS is basically an independent BSS (IBSS). For example, the IBSS may have only two STAs. In addition, the simplest BSS (BSS1 or BSS2) of FIG. 1, in which other components are omitted, may correspond to a representative example of the IBSS. Such a configuration is possible when STAs can directly perform communication. In addition, such a LAN is not configured in advance but may be configured if a LAN is necessary. This LAN may also be referred to as an ad-hoc network.

If an STA is turned on or off or if an STA enters or moves out of a BSS, the membership of the STA in the BSS may be dynamically changed. An STA may join a BSS using a synchronization process in order to become a member of the BSS. In order to access all services of a BSS based structure, an STA should be associated with the BSS. Such association may be dynamically set and may include use of a distribution system service (DSS).

Figure 2:
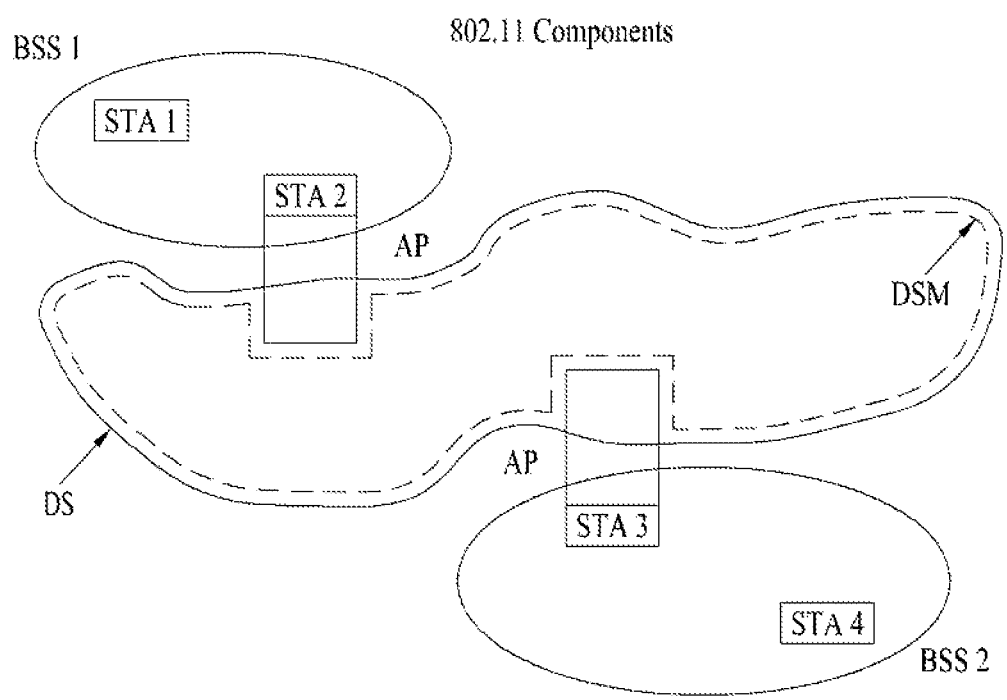
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, a distribution system (DS), a distribution system medium (DSM) and an access point (AP) are added to the structure of FIG. 1.

In a LAN, a direct station-to-station distance may be restricted by PHY performance. Although such distance restriction may be satisfactory in some cases, communication between stations located at a longer distance may be necessary. In order to support extended coverage, a DS may be configured.

The DS means a structure in which BSSs are mutually connected. More specifically, the BSSs are not independently present as shown in FIG. 1 but the BSS may be present as an extended component of a network including a plurality of BSSs.

The DS is a logical concept and may be specified by characteristics of the DSM. In IEEE 802.11 standards, a wireless medium (WM) and a DSM are logically distinguished. Logical media are used for different purposes and are used by different components. In IEEE 802.11 standards, such media are not restricted to the same or different media. Since a plurality of media are logically different, an IEEE 802.11 LAN structure (a DS structure or another network structure) may be flexible. That is, the IEEE 802.11 LAN structure may be variously implemented and a LAN structure may be independently specified by physical properties of each implementation.

The DS provides seamless integration of a plurality of BSSs and provides logical services necessary to treat an address to a destination so as to support a mobile apparatus.

The AP means an entity which enables associated STAs to access the DS via the WM and has STA functionality. Data transfer between the BSS and the DS may be performed via the AP. For example, STA2 and STA3 shown in FIG. 2 have STA functionality and provide a function enabling associated STAs (STA1 and STA4) to access the DS. In addition, since all APs correspond to STAs, all APs may be addressable entities. An address used by the AP for communication on the WM and an address used by the AP for communication on the DSM may not be equal.

Data transmitted from one of STAs associated with the AP to the STA address of the AP may always be received by an uncontrolled port and processed by an IEEE 802.1X port access entity. In addition, if a controlled port is authenticated, transmission data (or frames) may be transmitted to the DS.

Figure 3:
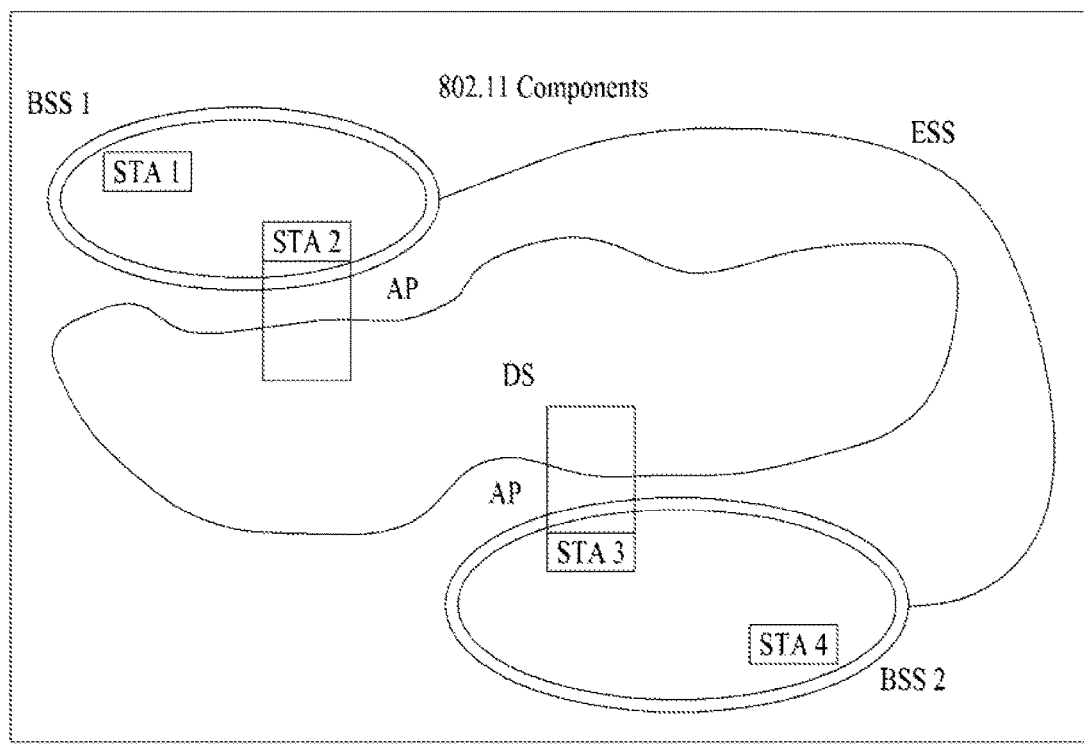
FIG. 3 is a diagram showing another exemplary structure of an IEEE 802.11 system to which the present invention is applicable.

FIG. 3 is a diagram showing another exemplary structure of an IEEE 802.11 system to which the present invention is applicable. In FIG. 3, an extended service set (ESS) for providing wide coverage is added to the structure of FIG. 2.

A wireless network having an arbitrary size and complexity may be composed of a DS and BSSs. In an IEEE 802.11 system, such a network is referred to as an ESS network. The ESS may correspond to a set of BSSs connected to one DS. However, the ESS does not include the DS. The ESS network appears as an IBSS network at a logical link control (LLC) layer. STAs included in the ESS may communicate with each other and mobile STAs may move from one BSS to another BSS (within the same ESS) transparently to the LLC layer.

In IEEE 802.11, relative physical locations of the BSSs in FIG. 3 are not assumed and may be defined as follows. The BSSs may partially overlap in order to provide consecutive coverage. In addition, the BSSs may not be physically connected and a distance between BSSs is not logically restricted. In addition, the BSSs may be physically located at the same location in order to provide redundancy. In addition, one (or more) IBSS or ESS network(s) may be physically present in the same space as one (or more) ESS network(s). This corresponds to an ESS network type such as a case in which an ad-hoc network operates at a location where the ESS network is present, a case in which IEEE 802.11 networks physically overlapped by different organizations are configured or a case in which two or more different access and security policies are necessary at the same location.

Figure 4:
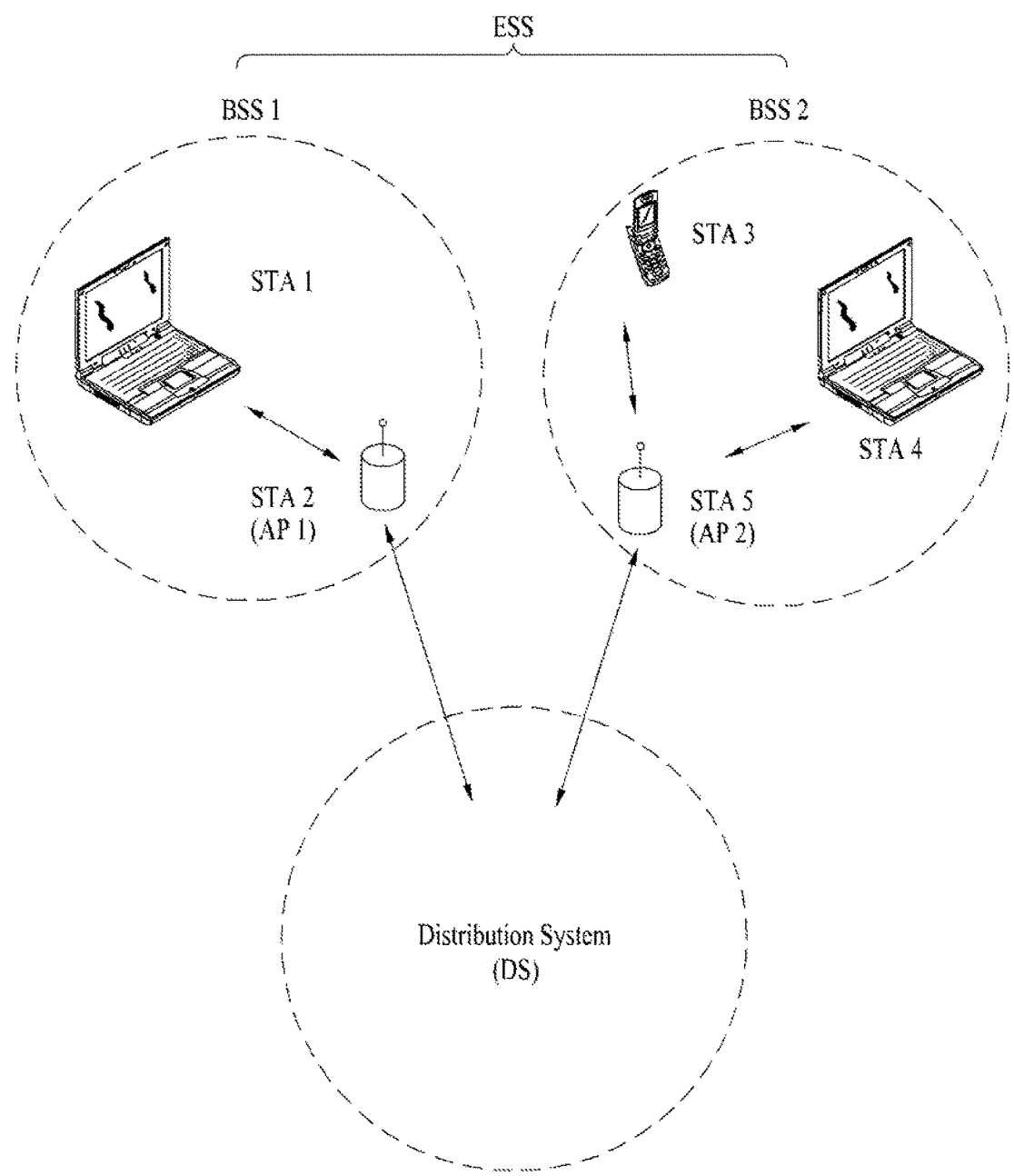
FIG. 4 is a diagram showing an exemplary structure of a wireless local area network (WLAN) system.

FIG. 4 is a diagram showing an exemplary structure of a WLAN system. FIG. 4 shows an example of an infrastructure BSS including a DS.

In the example of FIG. 4, BSS1 and BSS2 configure an ESS. In the WLAN system, an STA operates according to a MAC/PHY rule of IEEE 802.11. The STA includes an AP STA and a non-AP STA. The non-AP STA corresponds to an apparatus directly handled by a user, such as a laptop or a mobile phone. In the example of FIG. 4, STA1, STA3 and STA4 correspond to the non-AP STA and STA2 and STA5 correspond to the AP STA.

In the following description, the non-AP STA may be referred to as a terminal, a wireless transmit/receive unit (WTRU), a user equipment (UE), a mobile station (MS), a mobile terminal or a mobile subscriber station (MSS). In addition, the AP may correspond to a base station (BS), a Node-B, an evolved Node-B (eNB), a base transceiver system (BTS) or a femto BS.

Link Setup Process

Figure 5:
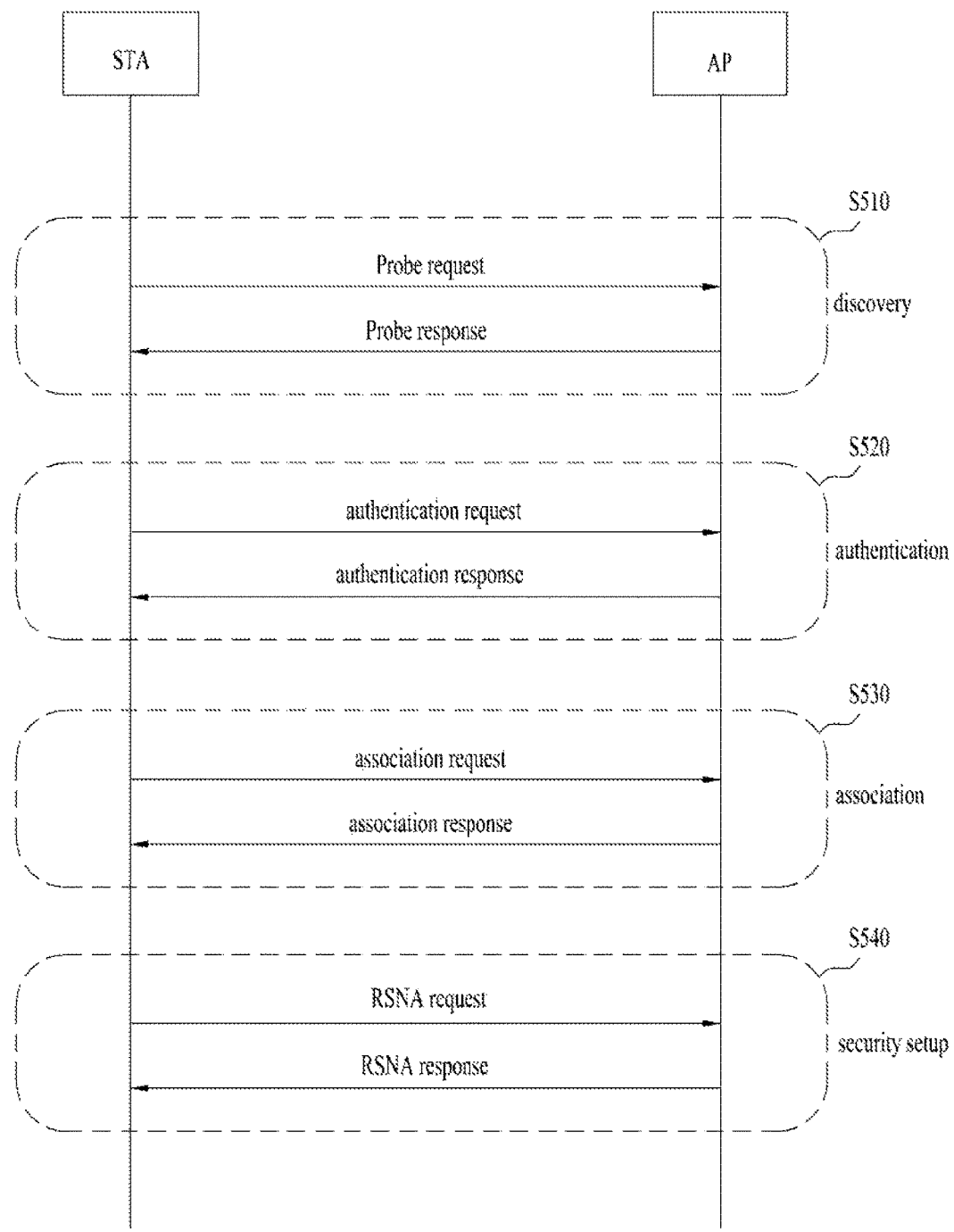
FIG. 5 is a diagram illustrating a link setup process in a WLAN system.

FIG. 5 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 5.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning.

The scanning method includes an active scanning method and a passive scanning method.

In FIG. 5, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on a second channel) using the same method.

Although not shown in FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs in the IBSS alternately transmit the beacon frame. The STA which performs scanning receives the beacon frame, stores information about the BSS included in the beacon frame, and records beacon frame information of each channel while moving to another channel. The STA, which has received the beacon frame, may store BSS related information included in the received beacon frame, move to a next channel and perform scanning on the next channel using the same method.

Active scanning has delay and power consumption less than those of passive scanning.

After the STA has discovered the network, an authentication process may be performed in step S520. Such an authentication process may be referred to as a first authentication process to be distinguished from a security setup operation of step S540.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA has been successfully authenticated, an association process may be performed in step S530. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capabilities, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S540. The security setup process of step S540 may be referred to as an authentication process through a robust security network association (RSNA) request/response. The authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL) frame. In addition, the security setup process may be performed according to a security method which is not defined in the IEEE 802.11 standard.

Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel. According to the MU-MIMO transmission scheme, the AP may simultaneously transmit packets to one or more MIMO-paired STAs.

In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. If received signal strength is equal to or greater than a predetermined value or if a DTV preamble is detected, it may be determined that the licensed user uses the frequency band.

In addition, as next-generation communication technology, machine-to-machine (M2M) communication technology is being discussed. Even in an IEEE 802.11 WLAN system, a technical standard supporting M2M communication has been developed as IEEE 802.11ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 6:
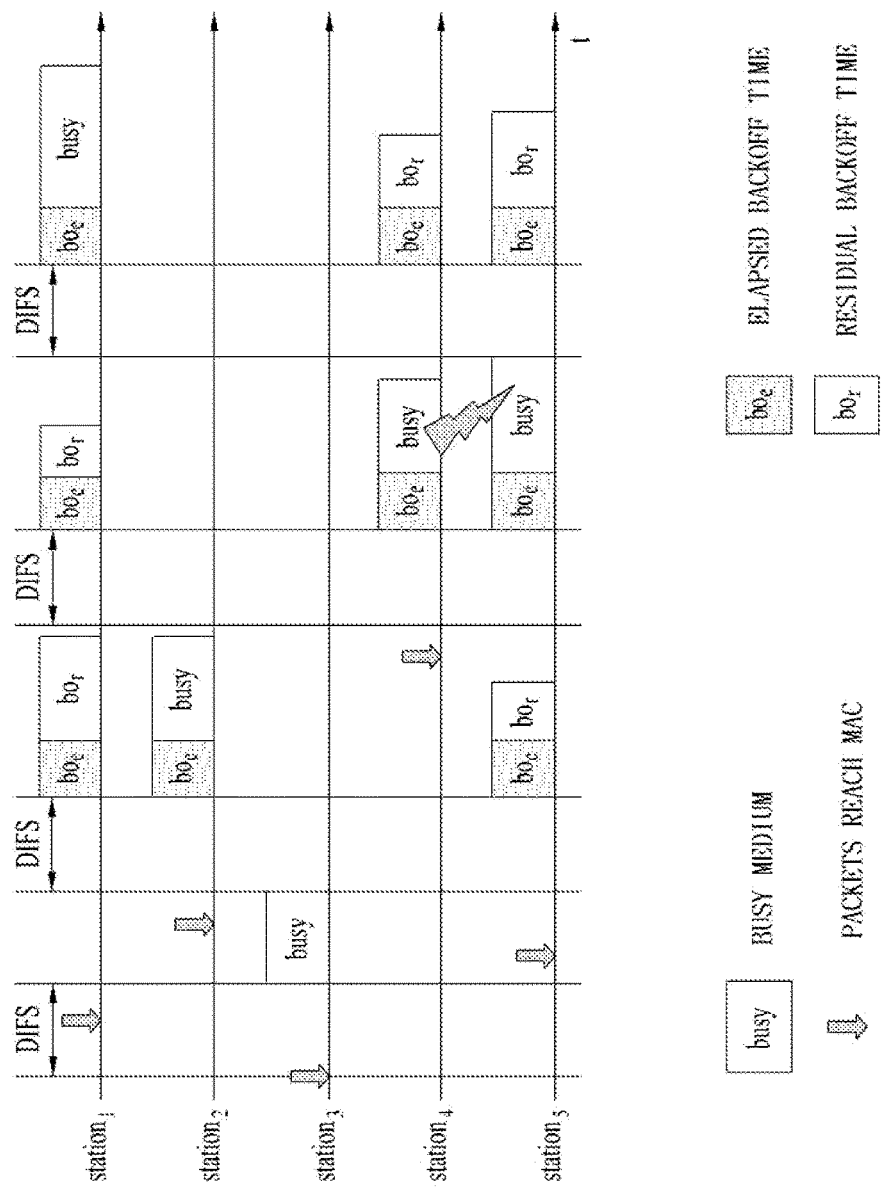
FIG. 6 is a diagram illustrating a backoff process.

FIG. 6 is a diagram illustrating a backoff process.

Operation based on a random backoff period will be described with reference to FIG. 6. If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2^n-1$ (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 6, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 6, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 7 and 8. Although a transmission range may not be equal to an actual carrier sensing range, for convenience, assume that the transmission range may be equal to the actual carrier sensing range.

Figure 7:
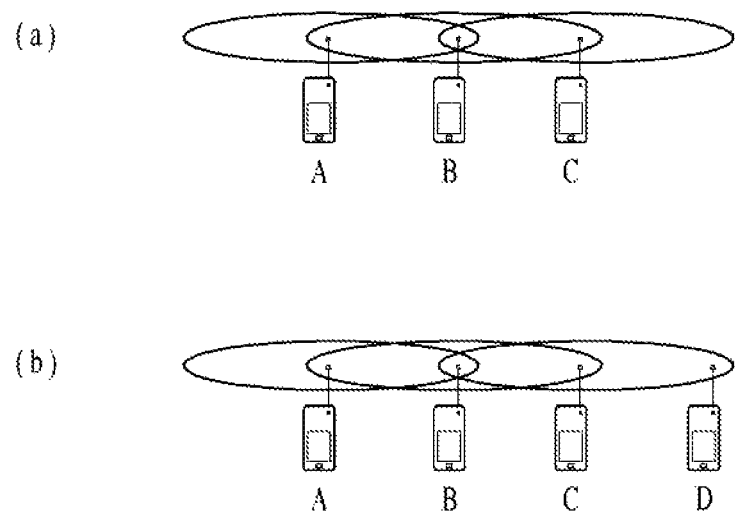
FIG. 7 is a diagram illustrating a hidden node and an exposed node.

FIG. 7 is a diagram illustrating a hidden node and an exposed node.

FIG. 7(a) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 7(b) shows an exposed node and, in this case, the STA B transmits data to the STA A and the STA C has information to be transmitted to the STA D. In this case, if the STA C performs carrier sensing, it may be determined that the medium is busy due to transmission of the STA B.

If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be the exposed node of the STA B.

Figure 8:
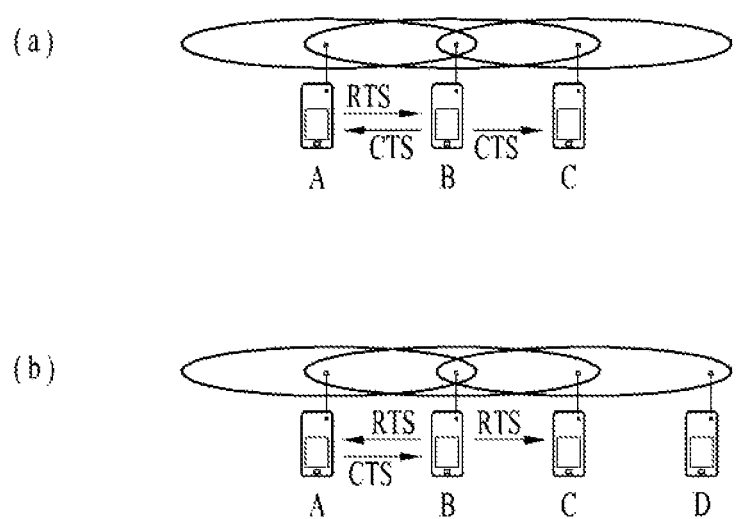
FIG. 8 is a diagram illustrating request to send (RTS) and clear to send (CTS)

FIG. 8 is a diagram illustrating request to send (RTS) and clear to send (CTS).

In the example of FIG. 7, in order to efficiently use a collision avoidance mechanism, short signaling packet such as RTS and CTS may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 8(*a*) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 8(*b*) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception or channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 9:
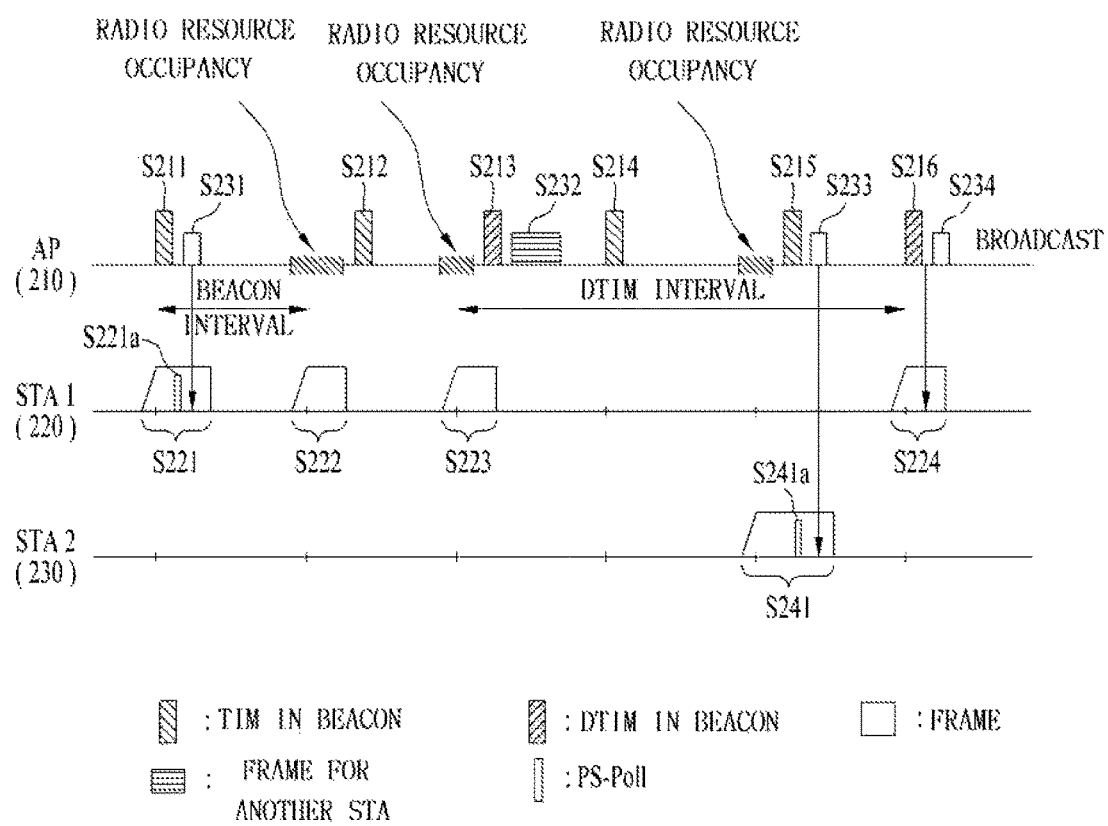
FIG. 9 is a diagram illustrating power management operation.

FIG. 9 is a diagram illustrating power management operation.

Referring to FIG. 9, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times. An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221*a*). The AP 210 may transmit the frame to the STA1 220 in correspondence with the PS-Poll frame (S231). The STA1 220 which completes frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefor is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241a) in order to request frame transmission. The AP 210 may transmit the frame to the STA2 230 in correspondence with the PS-Poll frame (S233).

For PM management shown in FIG. 9, a TIM element includes a TIM indicating whether a frame to be transmitted to an STA is present and a DTIM indicating whether a broadcast/multicast frame is present. The DTIM may be implemented by setting a field of the TIM element.

Figure 10:
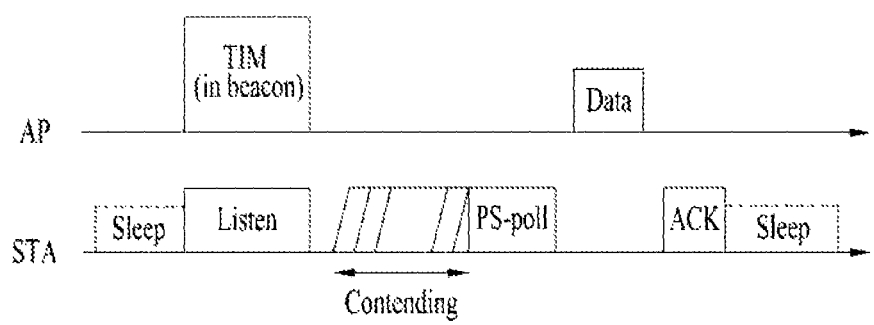
FIGS. 10 to 12 are diagram illustrating operation of a station (STA) which receives a TIM.
Figure 11:
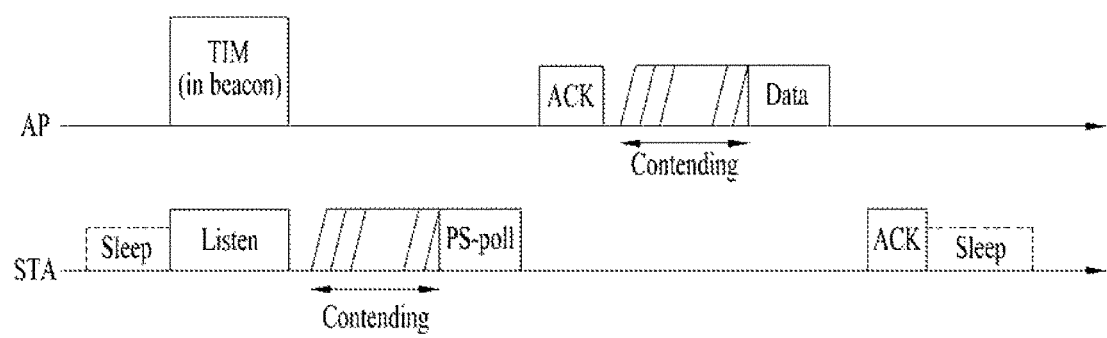
Figure 12:
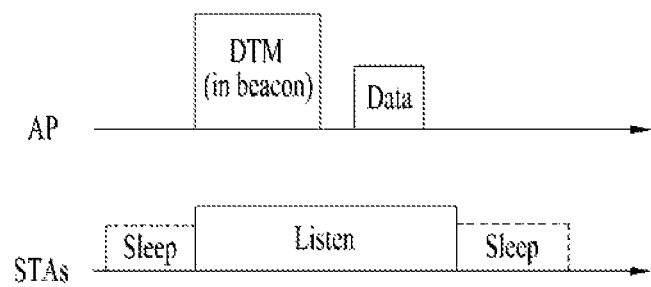

FIGS. 10 to 12 are diagrams illustrating operation of a station (STA) which receives a traffic indication map (TIM).

Referring to FIG. 10, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP, which has received the PS-Poll frame transmitted by the STA, may transmit the frame to the STA. The STA may receive the data frame and transmit an ACK frame to the AP. Thereafter, the STA may be switched to the sleep state again.

As shown in FIG. 10, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 11.

In the example of FIG. 11, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 12 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

TIM Structure

In the PM mode management method based on the TIM (or DTIM) protocol described with reference to FIGS. 9 to 12, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small. Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 13.

FIG. 13(a) shows an example of AIDs assigned based on a group. In the example of FIG. 13(a), several bits of a front part of the AID bitmap may be used to indicate the GID. For example, four GIDs may be expressed by the first two bits of the AID of the AID bitmap. If the total length of the AID bitmap is N bits, the first two bits (B1 and B2) indicate the GID of the AID.

FIG. 13(b) shows another example of AIDs assigned based on a group. In the example of FIG. 13(b), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(b), assume that all AIDs of 1 to N4 are divided into four groups. In this case, AIDs belonging to GID 1 are 1 to N1 and may be expressed by an offset 1 and a length N1. AIDs belonging to GID2 may be expressed by an offset N1+1 and a length N2−N1+1, AIDs belonging to GID 3 may be expressed by an offset N2+1 and a length N3−N2+1, and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 13(c). FIG. 13(c) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 13(c), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

Figure 13:
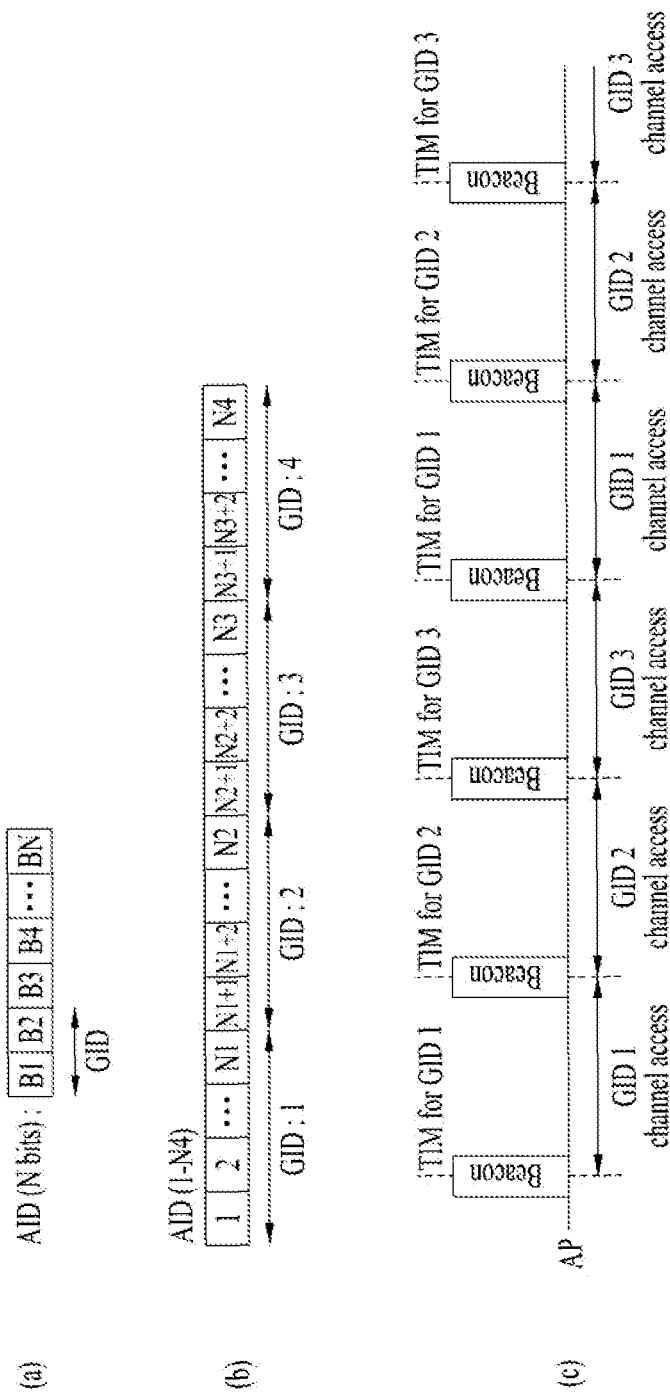
FIG. 13 is a diagram illustrating a group based association ID (AID)

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 13, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 13(a), the first N1 bits of the AID bitmap indicate a paging ID (that is, a PID), the next N2 bits indicate a block ID, the next N3 bits indicate a sub-block ID, and the remaining bits indicate the STA bit location in the sub-block.

In the following examples of the present invention, various methods of dividing and managing STAs (or AIDs assigned to the STAs) on a predetermined hierarchical group basis are applied and the group based AID assignment method is not limited to the above examples.

MAC Header Compression Method

In the present invention, a MAC header compression method is proposed in order to perform communication at low power. The MAC header compression method proposed by the present invention uses channel bandwidth of 1, 2, 4, 8 or 16 MHz, for example, and is applicable to an IEEE 802.11 system operating in a sub 1 GHz frequency band.

Figure 14:
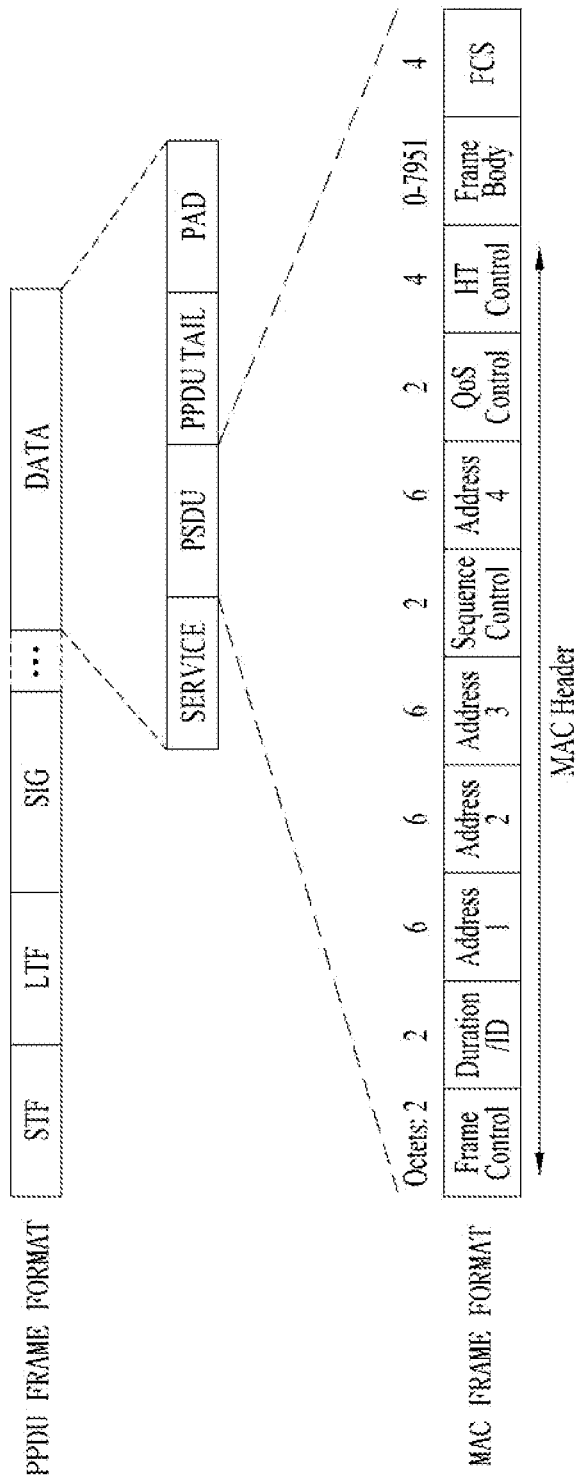
FIG. 14 is a diagram illustrating a conventional general frame structure used for an IEEE 802.11 system.

FIG. 14 is a diagram illustrating a conventional general frame structure used for an IEEE 802.11 system.

As shown in FIG. 14, the format of the general IEEE 802.11 physical layer convergence protocol (PLCP) packet data unit (PPDU) frame includes a short training field (STF), a long training field (LTF), a signal (SIG) field and a data field. The data field may include a service field, a PLCP service data unit (PSDU), a PPDU tail bit and, optionally, a padding bit.

The PSDU corresponds to a MAC PDU defined in a MAC layer, may include data generated/used by a higher layer and may be defined as a MAC frame. The MAC frame is basically composed of a MAC header, a frame body and a frame check sequence (FCS).

The MAC header includes a frame control field, a duration/ID field, an address field, etc. The frame control field may include control information necessary for frame transmission/reception. The duration/ID field may be set to a time required to transmit a frame. Four address fields Address 1, Address 2, Address 3 and Address 4 may be used to indicate a basic service set identifier (BSSID), a source address (SA), a destination address (DA), a transmitter address (TA), a receiver address (RA), etc. and may include only some of the four address fields according to frame type. For example, address field 1 may be set to a value corresponding to the address (RA) of the receiver which should receive the MAC frame and address field 2 may be set to a value corresponding to the address (TA) of the transmitter which transmits the MAC frame. In addition, the values of these address fields may be set in the form of an Ethernet MAC address having a size of 48 bits.

The MAC header is essentially included in a frame for data transmission. If the size of the MAC header is reduced (that is, if overhead of the MAC header is reduced), operation for generating, transmitting or receiving the MAC frame of the STA may be simplified and, as a result, power consumption of the STA may be reduced. Accordingly, in the present invention, a detailed method for compressing a MAC header by excluding a field related to unnecessary or omissible information from the MAC header or by mapping several overlapping fields to only one ID and transmitting the ID is proposed. The MAC header compressed according to the present invention may be referred to as a short MAC header.

In the present invention, as an example of a MAC header compression method, a method for replacing an existing MAC address with an association ID (AID) is proposed. Since an existing MAC address is defined to have a size of 48 bits, an address field having a length of 6 octets is necessary. In contrast, since an AID is defined to have a size (e.g., 16 bits) smaller than that of the MAC address, a field having a length (e.g., 2 octets) shorter than that of an existing address field may be used.

An existing AID is assigned to an STA as a unique identifier within a BSSID in a process of associating the STA with a BSS (exchange of an association request/response frame). However, in the present invention, a method for assigning a plurality of AIDs to one STA and assigning each AID according to properties of a flow (which may be referred to as traffic or a stream and, hereinafter, is collectively referred to as flow) is proposed.

AID Assignment Method Related to Flow

Instead of a MAC address of an STA, a method for using an AID of an STA will first be described. As shown in Table 1 below, instead of the MAC address of the STA, the AID of the STA may be used according to flow direction (uplink from the STA to an AP or downlink from the AP to the STA).

TABLE 1

| Flow direction | RA | TA |
| --- | --- | --- |
| Uplink | BSSID | AID |
| Downlink | AID | BSSID |

As shown in Table 1 above, in uplink, the BSSID (that is, the MAC address) may be used for the RA of the MAC header and the AID of the STA for transmitting an uplink flow may be used for the TA. In downlink, the BSSID (that is, the MAC address) may be used for the TA of the MAC header and the AID of the STA for receiving a downlink flow may be used for the RA. Accordingly, by at least compressing one field having a length of 6 octets in an address field to a field having a length of 2 octets as compared to an existing MAC header, it is possible to reduce MAC header overhead by 4 octets. The compressed MAC header may be referred to as a short MAC header.

If the AID is used instead of the MAC address, the length is reduced by 4 octets only. Therefore, MAC header compression efficiency is not so high. Accordingly, in the present invention, a method for maximizing MAC header compression efficiency by assigning an AID according to properties of a flow (or in flow units) is proposed.

If an existing AID is only used to identify a transmitter/receiver of a frame, the AID proposed by the present invention may be used to identify a flow related to the transmitter/receiver as well as the transmitter/receiver of the frame. That is, the existing AID may be assigned to one STA as one unique identifier. However, according to the present invention, one STA may be assigned a plurality of AIDs and each of the plurality of AIDs may be assigned to each flow of the STA as a unique identifier. The AID assigned to the flow proposed by the present invention should be differentiated from a flow ID. Since the flow ID indicates a QoS level of a flow, the flow ID is not used to differentiate between different flows and does not function as an AID for identifying a transmitter/receiver.

An AID assignment frame may be used to assign an AID to a flow according to the present invention.

FIG. 15 is a diagram showing an exemplary format of an AID assignment frame proposed by the present invention. An STA may transmit an AID assignment frame to an AP in order to request assignment of an AID to a specific flow. In this case, in FIG. 15, the AID field may be set to a specific value (e.g., 0) indicating a request for AID assignment. A flow information element field may include information indicating properties of the flow (e.g., traffic classification, duty cycle, wakeup interval, group identification information, etc.). In addition, the flow information element field may further include a variety of information related to the flow. For example, the flow information element field may include address fields of a MAC header (Address 1, Address 2, Address 3, Address 4), a source IP address, a destination IP, a subnetwork access protocol (SNAP)/logical link control (LLC) header, an IP header, a transmission control protocol (TCP)/user datagram protocol (UDP) header, etc.

The AP, which has received the flow AID assignment frame, may assign an AID mapped to the flow information and send the AID to the STA. Therefore, a transmitter address and a receiver address of a specific flow and a variety of information about the properties of the flow are mapped to one AID. Since the AP assigns the AID to each flow of the STA, one STA may be assigned a plurality of AIDs.

The AID field of the flow AID assignment frame transmitted from the AP to the STA may be set to an AID value assigned to a specific flow requested by the STA. Here, as described above, if a specific value (e.g., 0) of the AID field is defined to indicate an AID request, the AID assigned to the STA may be set to a value other than the specific value. The flow information element field of the flow AID assignment frame transmitted from the AP to the STA may equally include information included in the flow information element field of the flow AID assignment frame transmitted by the STA.

In addition, if the STA releases the AID assigned to the specific flow, the flow AID assignment frame which does not include the flow information element field may be used. In this case, in the flow AID assignment frame transmitted from the STA to the AP, the AID field may include the AID value assigned to the flow to be released by the AP. If an ACK frame is received from the AP at an SIFS time after the STA transmits the flow AID assignment frame to the AP, use of the AID may be stopped/released.

In addition, the AP may assign an AID related to a specific flow to the STA without a request of the STA (that is, in an unsolicited manner). In this case, in a flow AID assignment frame transmitted from the AP to the STA, an AID field may include an AID value to be assigned and a flow information element field may include flow related information (e.g., a transmitter address, a receiver address, a variety of information about the properties of the flow, etc.).

In this case, the STA may determine whether the AID assigned to the flow is accepted based on the information included in the flow AID assignment frame received from the AP. Determining whether the flow related AID is accepted may be expressed by determining whether MAC header compression of the flow is performed based on the AID and flow information element.

If the STA does not accept the AID assigned to the flow, the STA may transmit, to the AP, a flow AID assignment frame which includes the AID assigned by the AP but does not include a flow information element field. In this case, if the AP receives a signal indicating that the STA does not accept or releases the AID assigned thereby, the AP does not perform MAC header compression with respect to the flow.

Since the flow related AID defined as described above is mapped to flow related information (e.g., a transmitter address, a receiver address, a variety of information about the properties of the flow, etc.) and the mapping relationship is already known to the STA and the AP (e.g., the STA and the AP can know the mapping relationship by exchanging the flow AID assignment frame), the STA and the AP may identify the flow using the AID only without additional information exchange of a specific flow and confirm the flow related information. Accordingly, if the AID proposed by the present invention is used, address fields (Address 1, Address 2, Address 3 and Address 4) may be omitted from the MAC header and information about a source Internet protocol (IP) address, a destination IP address, a SNAP/LLC header, an IP header, a TCP/UDP header, etc. may also be omitted. Therefore, as compared to the MAC header compression scheme for simply replacing the MAC address with the AID, more efficient MAC frame compression may be performed by introducing the flow related AID, and overhead of the MAC frame may be significantly reduced. By using the AID proposed by the present invention, information omitted from the MAC frame may correspond to information pre-exchanged between the STA and the AP via a flow information element field of the flow AID assignment frame. Since the information exchanged via the flow AID assignment frame is transmitted and received only once in the AID assignment step, overhead is not so increased. By introducing the AID proposed by the present invention, overhead reduction efficiency due to omission of the information included in all MAC frames is relatively large.

In addition, in direct communication between STAs, the MAC header address field may be configured as shown in Table 2 below.

TABLE 2

|  | RA | TA |
| --- | --- | --- |
| Direct communication | Receiver MAC address | AID |

Assume that direct communication between STAs includes transmission from STA1 to STA2. In this case, the flow related AID may be assigned by the reception STA (e.g., STA2), not by the AP. That is, in direct link communication between STAs, the reception STA may independently manage the flow related AID.

The transmission STA (STA1) may transmit the flow AID assignment frame to the reception STA (STA2) as shown in FIG. 15 in order to request assignment of an AID to a specific flow. In this case, the AID field may be set to a specific value (e.g., 0) indicating an AID assignment request. The flow information element field may include a variety of information (e.g., traffic classification, duty cycle, wakeup interval, address fields of a MAC header (Address 1, Address 2, Address 3, Address 4), source IP address, destination IP address, SNAP/LLC header, IP header, TCP/UDP header, etc.) indicating the properties of the flow.

The STA (STA2), which has received the flow AID assignment frame, may assign the AID mapped to the flow and send the AID to the transmission STA (STA1). The AID field of the flow AID assignment frame transmitted from the reception STA (STA2) to the transmission STA (STA1) may be set to the AID value assigned to the flow requested by the transmission STA (STA1). Here, if the specific value (e.g., 0) of the AID field is defined to indicate the AID request, the AID assigned to the transmission STA (STA1) may be set to a value other than the specific value. In addition, the information about the requested flow may be included in the flow information element field.

As described above, according to the present invention, a plurality of AIDs may be assigned to one STA supporting a plurality of flows having different properties and each of the plurality of AIDs may be assigned according to flow property. The flow property may be specified according to a transmitter/receiver address, according to a duty cycle at which the STA performs flow transmission and reception or according to wakeup interval at which the STA wakes up for flow transmission and reception. If the STA belongs to a specific group for flow transmission and reception, the AID may serve as information for identifying the specific group. Further, if the AID proposed by the present invention is used, overhead of the frame transmitted/received by the STA may be significantly reduced and power consumption of the STA may be reduced. Therefore, it is possible to significantly increase STA operation efficiency.

Figure 16:
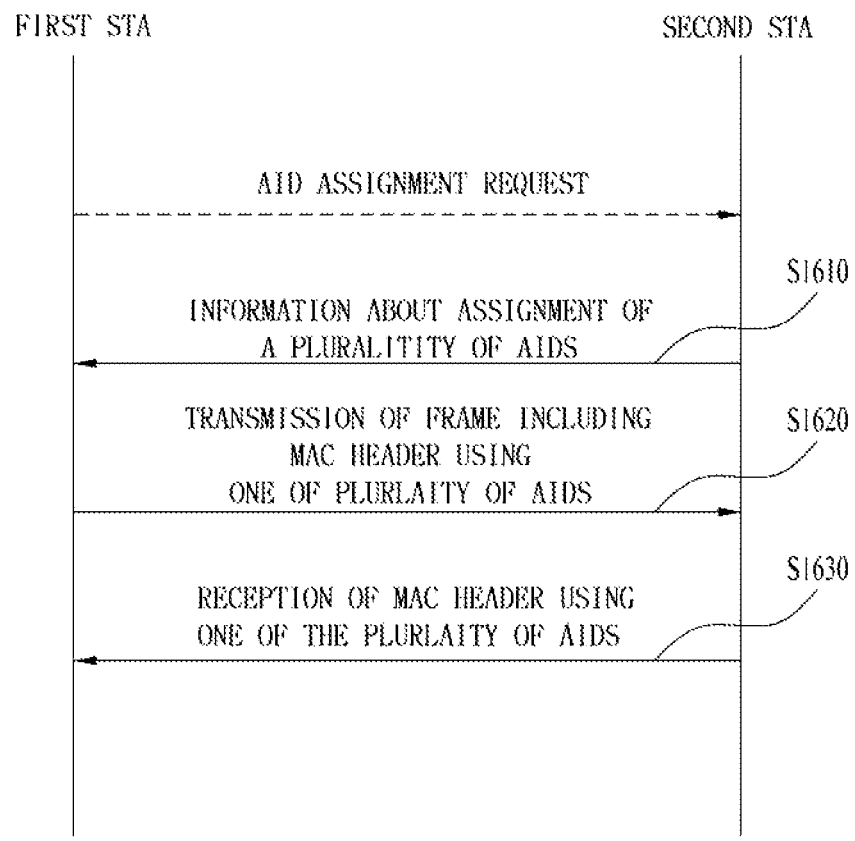
FIG. 16 is a diagram illustrating a frame transmission/reception method of an STA according to an example of the present invention.

FIG. 16 is a diagram illustrating a frame transmission/reception method of an STA according to an example of the present invention.

In step S1610, a first STA may receive information about assignment of a plurality of AIDs from a second STA. The information about assignment of the plurality of AIDs may be received as a response to an AID assignment request transmitted from the first STA to the second STA before step S1610 or the second STA may assign the plurality of AIDs to the first STA without a request of the first STA in an unsolicited manner. Each of the plurality of AIDs may be a flow related AID assigned to each flow. In addition, for request/response of assignment of the plurality of AIDs, the flow AID assignment frame described with reference to FIG. 15 may be used.

In step S1620, the first STA may transmit a data frame to the second STA. In an address field (in particular, a transmitter address field) of a MAC header of the frame, one of the plurality of AIDs (that is, AID assigned to each flow) assigned in step S1610 may be used.

In addition, in step S1630, the first STA may receive the data fame from the second STA. In an address field (in particular, a receiver address field) of a MAC header of the frame, one of the plurality of AIDs (that is, AID assigned to each flow) assigned in step S1610 may be used.

Steps S1620 and S1630 may be independently performed. That is, step S1620 may be performed earlier or later than step S1630 and only any one of steps S1620 or S1630 may be performed.

If the second STA is an AP, as described with reference to Table 1 above, the AID assigned to each flow may be used in one of a receiver address and a transmitter address according to flow direction. If the second STA is a non-AP STA, as described with reference to Table 2 above, direct link communication is performed and the AID assigned to each flow may be used in a transmitter address of a MAC header of a frame and a MAC address of a receiver may be used in a receiver address.

Details described in the above embodiments of the present invention may be independently applied or two or more embodiments may be simultaneously applied.

Figure 17:
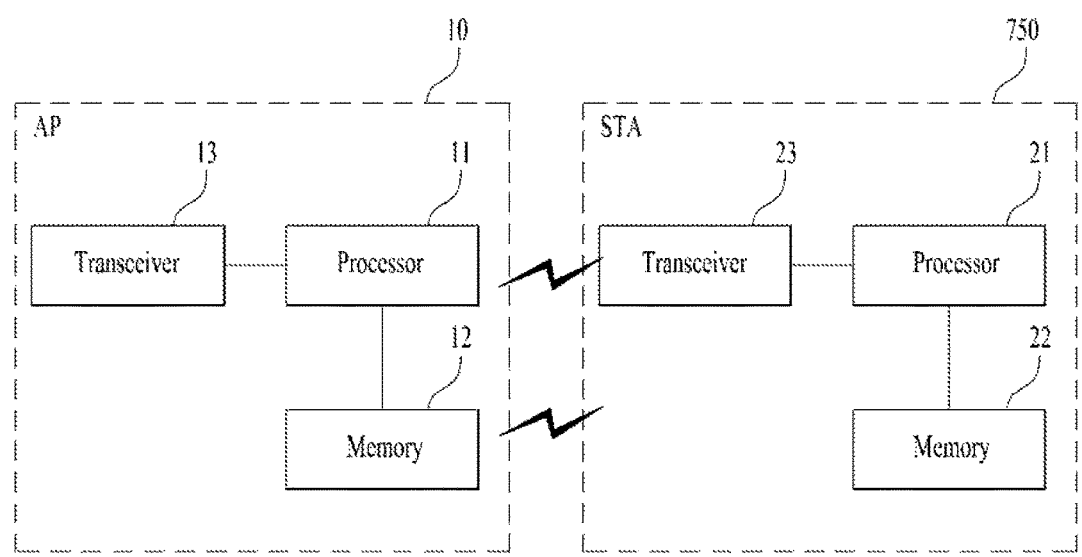
FIG. 17 is a block diagram showing the configuration of a wireless apparatus according to one embodiment of the present invention.

FIG. 17 is a block diagram showing the configuration of a wireless apparatus according to one embodiment of the present invention.

The AP 10 may include a processor 11, a memory 12 and a transceiver 13. The STA 20 may include a processor 21, a memory 22 and a transceiver 23. The transceivers 13 and 23 may transmit/receive a radio frequency (RF) signal and implement a physical layer according to an IEEE 802 system, for example. The processors 11 and 21 may be respectively connected to the transceivers 13 and 21 to implement a physical layer and/or an MAC layer according to the IEEE 802 system. The processors 11 and 21 may be configured to perform operation according to the above-described various embodiments of the present invention. In addition, modules implementing operations of the AP and the STA according to the above-described embodiments of the present invention may be stored in the memories 12 and 22 and may be executed by the processors 11 and 21, respectively. The memories 12 and 22 may be mounted inside or outside the processors 11 and 21 to be connected to the processors 11 and 21 by known means, respectively.

The detailed configuration of the AP and the STA apparatus may be implemented such that details described in the above embodiments of the present invention is independently applied or two or more embodiments are simultaneously applied. In this case, overlapping details will be omitted from the description for clarity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above-described various embodiments of the present invention are applied to the IEEE 802.11 system, the embodiments of the present invention are applicable to various mobile communication systems.

The invention claimed is:

1. A method for transmitting a frame at a first station (STA) in a wireless communication system, the method comprising:

transmitting, to a second STA, a flow association identifier (AID) assignment frame for requesting assignment of a plurality of AIDs, the flow AID assignment frame including an AID field and a flow information element field;

receiving, from the second STA, information related to assignment of the plurality of AIDS to the first STA; and transmitting, to the second STA, a first frame including a medium access control (MAC) header that includes an address field set to one of the plurality of AIDs, each of the plurality of AIDS assigned to each flow of the first STA, wherein release of assignment of one of the plurality of AIDs is indicated by a flow AID assignment frame including the AID field but not including the flow information element field.

2. The method according to claim 1, wherein each of the plurality of AIDs is mapped to information for specifying a flow of the first STA.

3. The method according to claim 2, wherein the information for specifying the flow includes at least a traffic classification, a duty cycle, a wakeup interval, group identification information, a transmitter MAC address, a receiver MAC address, a source Internet protocol (IP) address, a destination IP address, a subnetwork access protocol (SNAP)/logical link control (LLC) header, an IP header, or transmission control protocol (TCP)/user data gram protocol (UDP) header information.

4. The method according to claim 1, wherein:
the second STA is an access point (AP), and
the MAC header of the first frame includes a basic service set identifier (BSSID) of the AP as a receiver address (RA) and includes one of the plurality of AIDs assigned to the first STA as a transmitter address (TA).

5. The method according to claim 1, wherein:
the second STA is an access point (AP);
the method further comprises receiving, from the AP, a second frame including a MAC header including an address field set to one of the plurality of AIDs; and
the MAC header of the second frame includes one of the plurality of AIDs assigned to the first STA as a receiver address (RA) and includes a basic service set identifier (BSSID) of the AP as a transmitter address (TA).

6. The method according to claim 1, wherein the MAC header of the first frame includes a MAC address of the second STA as a receiver address (RA) and includes one of the plurality of AIDs assigned to the first STA as a transmitter address (TA).

7. The method according to claim 1, wherein a value of the AID field is set to 0.

8. The method according to claim 1, wherein the flow information element field includes information for specifying a flow of the first STA.

9. The method according to claim 8, wherein the information for specifying the flow includes at least a traffic classification, a duty cycle, a wakeup interval, group identification information, a transmitter MAC address, a receiver MAC address, a source Internet protocol (IP) address, a destination IP address, a subnetwork access protocol (SNAP)/logical link control (LLC) header, an IP header, or transmission control protocol (TCP)/user data gram protocol (UDP) header information.

10. An apparatus of a first station (STA) for transmitting a frame in a wireless communication system, the apparatus comprising:
a transceiver configured to transmit and receive signals; and
a processor configured to control the transceiver to:
transmit, to a second STA, a flow association identifier (AID) assignment frame for requesting assignment of a plurality of AIDs, the flow AID assignment frame including an AID field and a flow information element field;
receive, from the second STA, information related to assignment of the plurality of AIDs to the first STA; and
transmit, to the second STA, a first frame including a medium access control (MAC) header that includes an address field set to one of the plurality of AIDs, each of the plurality of AIDS assigned to each flow of the first STA,
wherein release of assignment of one of the plurality of AIDs is indicated by a flow AID assignment frame including the AID field but not including the flow information element field.

11. The apparatus according to claim 10, wherein each of the plurality of AIDs is mapped to information for specifying a flow of the first STA.

12. The apparatus according to claim 11, wherein the information for specifying the flow includes at least a traffic classification, a duty cycle, a wakeup interval, group identification information, a transmitter MAC address, a receiver MAC address, a source Internet protocol (IP) address, a destination IP address, a subnetwork access protocol (SNAP)/logical link control (LLC) header, an IP header, or transmission control protocol (TCP)/user data gram protocol (UDP) header information.

13. The apparatus according to claim 10, wherein:
the second STA is an access point (AP), and
the MAC header of the first frame includes a basic service set identifier (BSSID) of the AP as a receiver address (RA) and includes one of the plurality of AIDs assigned to the first STA as a transmitter address (TA).

14. The apparatus according to claim 10, wherein:
the second STA is an access point (AP):
the processor is further configured to control the transceiver to receive, from the AP, a second frame including a MAC header including an address field set to one of the plurality of AIDs; and
the MAC header of the second frame includes one of the plurality of AIDs assigned to the first STA as a receiver address (RA) and includes a basic service set identifier (BSSID) of the AP as a transmitter address (TA).

15. The apparatus according to claim 10, wherein the MAC header of the first frame includes a MAC address of the second STA as a receiver address (RA) and includes one of the plurality of AIDs assigned to the first STA as a transmitter address (TA).

16. The apparatus according to claim 10, wherein a value of the AID field is set to 0.

17. The apparatus according to claim 10, wherein the flow information element field includes information for specifying a flow of the first STA.

18. The apparatus according to claim 17, wherein the information for specifying the flow includes at least a traffic classification, a duty cycle, a wakeup interval, group identification information, a transmitter MAC address, a receiver MAC address, a source Internet protocol (IP) address, a destination IP address, a subnetwork access protocol (SNAP)/logical link control (LLC) header, an IP header, or transmission control protocol (TCP)/user data gram protocol (UDP) header information.

\* \* \* \* \*